(12) United States Patent
Desai et al.

(10) Patent No.: US 12,110,049 B2
(45) Date of Patent: Oct. 8, 2024

(54) FOLDABLE CONTAINERS WITH IMPROVED DUMPING FEATURES

(71) Applicant: Amazon Technologies, Inc., Seattle, WA (US)

(72) Inventors: Jainil Nilesh Desai, Schaumburg, IL (US); Spencer Cates, Seattle, WA (US); Daniel Eugene Lowther, New Hope, PA (US); Kevin Wolcott, Nashville, TN (US); Kaushal Bharatkumar Mehta, Seattle, WA (US); Ashwini Kotraiah Davangere, Frisco, TX (US); Eric Edmond Swensen, Houston, TX (US); Jessica Fitzgerald, Moorestown, NJ (US); Tom Rattini, St. Charles, MO (US); Damien Duffy, Florissant, MO (US)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 17/545,356

(22) Filed: Dec. 8, 2021

(65) Prior Publication Data

US 2023/0174129 A1    Jun. 8, 2023

(51) Int. Cl.
*B62B 3/02*    (2006.01)
(52) U.S. Cl.
CPC .................................. *B62B 3/025* (2013.01)
(58) Field of Classification Search
CPC .......... B62B 3/025; B62B 3/004; B62B 3/184
See application file for complete search history.

(56) References Cited

U.S. PATENT DOCUMENTS 11,311,122 B2 * 4/2022 Marivoet ................ B62B 3/005
11,767,047 B2 * 9/2023 Pajevic .................... B62B 3/003
                                                         280/651

(Continued)

FOREIGN PATENT DOCUMENTS

AU        514192 B2    1/1981
DE   202015006120 U1   12/2016

(Continued)

OTHER PUBLICATIONS

Translated KR-102168396-B1 (Year: 2024).*
IPO, "Combined Search and Examination Report" Application No. GB 2218083.0, mailed Jun. 12, 2023, 8 pages.

*Primary Examiner* — James A Shriver, II
*Assistant Examiner* — Ian Bryce Shelton
(74) *Attorney, Agent, or Firm* — Eversheds Sutherland (US) LLP

(57) ABSTRACT

Systems and methods are disclosed for foldable containers with improved dumping features. In one embodiment, an example foldable container may include a first container wall, a second container wall coupled to the first container wall at a first joint, the second container wall configured to rotate outwards in a first direction with respect to the first container wall, and a third container wall coupled to the first container wall at a second joint, the third container wall oriented perpendicular to the first container wall. Example foldable containers may include a number of wheels and smooth side panels, where a first cross-sectional area of the foldable container at a lower portion of the foldable container is greater than a second cross-sectional area of the foldable container at an upper portion of the foldable container.

20 Claims, 8 Drawing Sheets

(56) References Cited

U.S. PATENT DOCUMENTS

| | | | |
|---|---|---|---|
| 11,887,049 B1 * | 1/2024 | Meiswinkel | F16P 3/144 |
| 2016/0082996 A1 * | 3/2016 | Jackson | B62B 3/1476 |
| | | | 280/33.996 |
| 2017/0071362 A1 * | 3/2017 | Marler | A47B 55/02 |
| 2019/0270545 A1 * | 9/2019 | Apps | B65D 21/086 |
| 2019/0328159 A1 * | 10/2019 | Marivoet | A47F 3/0439 |
| 2021/0245790 A1 * | 8/2021 | Finstad | A47B 96/061 |
| 2022/0041198 A1 * | 2/2022 | Major | B62B 3/025 |
| 2022/0297733 A1 * | 9/2022 | Pajevic | B65D 21/086 |
| 2023/0159264 A1 * | 5/2023 | Jolivette | B65D 25/2841 |
| | | | 220/4.33 |

FOREIGN PATENT DOCUMENTS

| | | | | |
|---|---|---|---|---|
| DE | 202017105784 U1 | | 10/2017 | |
| DE | 102019107821 A1 | * | 10/2020 | |
| DE | 202020100095 U1 | * | 5/2021 | |
| EP | 3647154 A1 | * | 5/2020 | B62B 3/004 |
| FR | 3086253 A1 | * | 3/2020 | B62B 3/004 |
| GB | 2534263 A | * | 7/2016 | B62B 3/18 |
| GB | 2535570 A | | 8/2016 | |
| GB | 2606819 A | | 11/2022 | |
| JP | H08217073 A | * | 8/1996 | |
| KR | 20210041934 A | * | 10/2019 | |
| KR | 102041795 B1 | * | 11/2019 | |
| KR | 102168396 B1 | * | 10/2020 | |
| KR | 20210041937 A | * | 4/2021 | |
| WO | WO-2006067474 A1 | * | 6/2006 | B62B 3/003 |
| WO | WO-2018109655 A1 | * | 6/2018 | A47B 31/04 |

\* cited by examiner ns or components other than those illustrated in the drawings, and some elements and/or components may not be present in various embodiments. The use of singular terminology to describe a component or element may, depending on the context, encompass a plural number of such components or elements and vice versa.

FOLDABLE CONTAINERS WITH IMPROVED DUMPING FEATURES

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
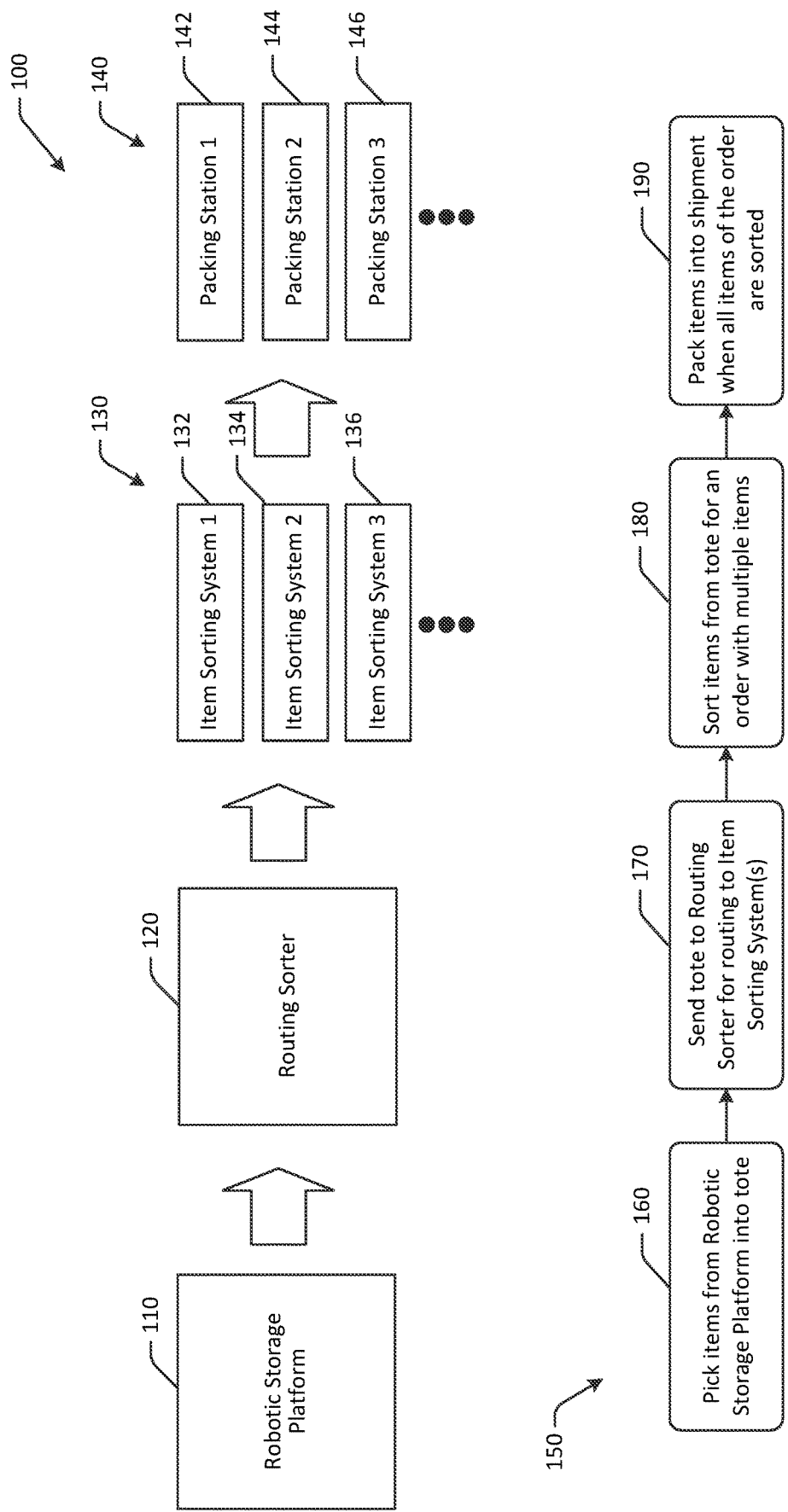
FIG. 1 is a hybrid schematic illustration of an example use case for foldable containers with improved dumping features and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers or packages for transport, sortation, etc., the packages may be placed in foldable containers that are configured to hold a plurality of packages. For example, a foldable container may be filled with packages that are destined for another fulfillment center or other facility. The foldable containers described herein may be used not only to store packages or other items, but may also be used to transport the packages to another facility. For example, in some embodiments, the foldable containers may be filled with packages, and the filled foldable container may be loaded onto a truck and transported to another facility. At the destination facility, the entire foldable container may be unloaded from the truck and scanned to identify the contents of the foldable container, without having to empty the foldable container. This may allow for increased efficiency and reduced handling of individual packages, and may also provide the ability for foldable containers to be used across any number of facilities and/or workstations within a facility.

Once the foldable container is unloaded from a truck, or otherwise reaches its destination within a facility (e.g., if the foldable container does not leave a facility, etc.), the foldable container may be dumped so as to remove its contents (e.g., from its open top, etc.). For example, the foldable container may be dumped onto a conveyor, such that the packages or other items inside the foldable container fall onto the conveyor. Foldable containers may be dumped manually (e.g., using equipment, etc.) or automatically. Depending on the configuration of the foldable container, during the dumping process, some packages may jam, get stuck, or otherwise fail to fall from the foldable container onto the conveyor. This may be particularly problematic when the foldable container has mesh sidewalls, where packages can get caught and create jams. In addition, packages may not fall from the foldable container until the foldable container is almost fully inverted (e.g., rotated almost 180 degrees, etc.). This may cause a need for manual intervention, jam clearing, repeated back-and-forth movement of the foldable container, and so forth to dump the packages, thereby causing downstream delays.

Embodiments of the disclosure include foldable containers having improved dumping features that maintain overall container volume and ergonomics, improve ejection rates of packages or other objects, reduce processing time, and increase throughput by avoiding jams. Some embodiments include smooth, flat sidewall panels to eliminate catch points. Some embodiments include lips that may be formed of a different material than a rear wall (e.g., formed of polypropylene, etc.) to prevent packages catching in gaps between walls of the foldable container. Some embodiments include one or more jogs or angled surfaces on the rear and/or sidewalls to provide space for cart handle features and maximize interior volume. Jogs in the sidewalls may allow space for addition of a handle to pull the container out of a trailer without impacting interior volume. Jogs in the rear panel may allow for capture of additional volume and add structural members for reinforcement with minimal impact on the volume of the cart. The smooth jog features also improve dumping by creating a smooth surface and a gentle slope. Some embodiments include improved door design features, where mounting of panels on doors provides a smooth transition for packages during dumping. On the top of the door, looking from inside, the panel is mounted on top of frame. On the bottom of the door, this is reversed, the panel is tucked under the frame. This allows for a smooth transition when the container is in dumping position without any obstructions for packages to eject.

Foldable containers may be folded into a folded L-shaped configuration to conserve space when not in use, and may be unfolded into a rectangular configuration when in use. Embodiments may be configured for both manual and robotic use. For example, foldable carts as described herein may be configured to be pushed, pulled, or otherwise manipulated manually by a human operator, and may also be lifted and transported by a robot. This flexibility may provide improved dual usability for various functions within a fulfillment center, and may reduce or eliminate the need for different container designs for manual and robotic use. In addition, the foldable containers described herein may be configured to provide ergonomic support for manual use, while also providing structural rigidity to be lifted from a bottom surface using a robot.

In some embodiments, foldable containers as described herein may be loaded with packages destined for a delivery station. The foldable containers may be sorted and transported while the packages or other items remain in the foldable containers. Sortation and/or movement of the foldable containers may be performed using robots and/or manually.

Embodiments of the disclosure include foldable containers with improved dumping features. For example, foldable containers may be pushed, pulled, or otherwise manipulated manually by human operators, and may also be lifted and moved or transported by robots. Some robots may lift the foldable containers from a bottom surface or a bottom platform. The foldable containers may be configured to fold and be stored or stacked in a nested configuration to save space as well. Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for foldable containers with improved dumping features and an example process flow is depicted in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in foldable containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. For example, the packages may be placed into foldable containers for shipment to another fulfillment center, a sort center, or another facility. At the subsequent facility, the foldable container may be dumped to remove its contents.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
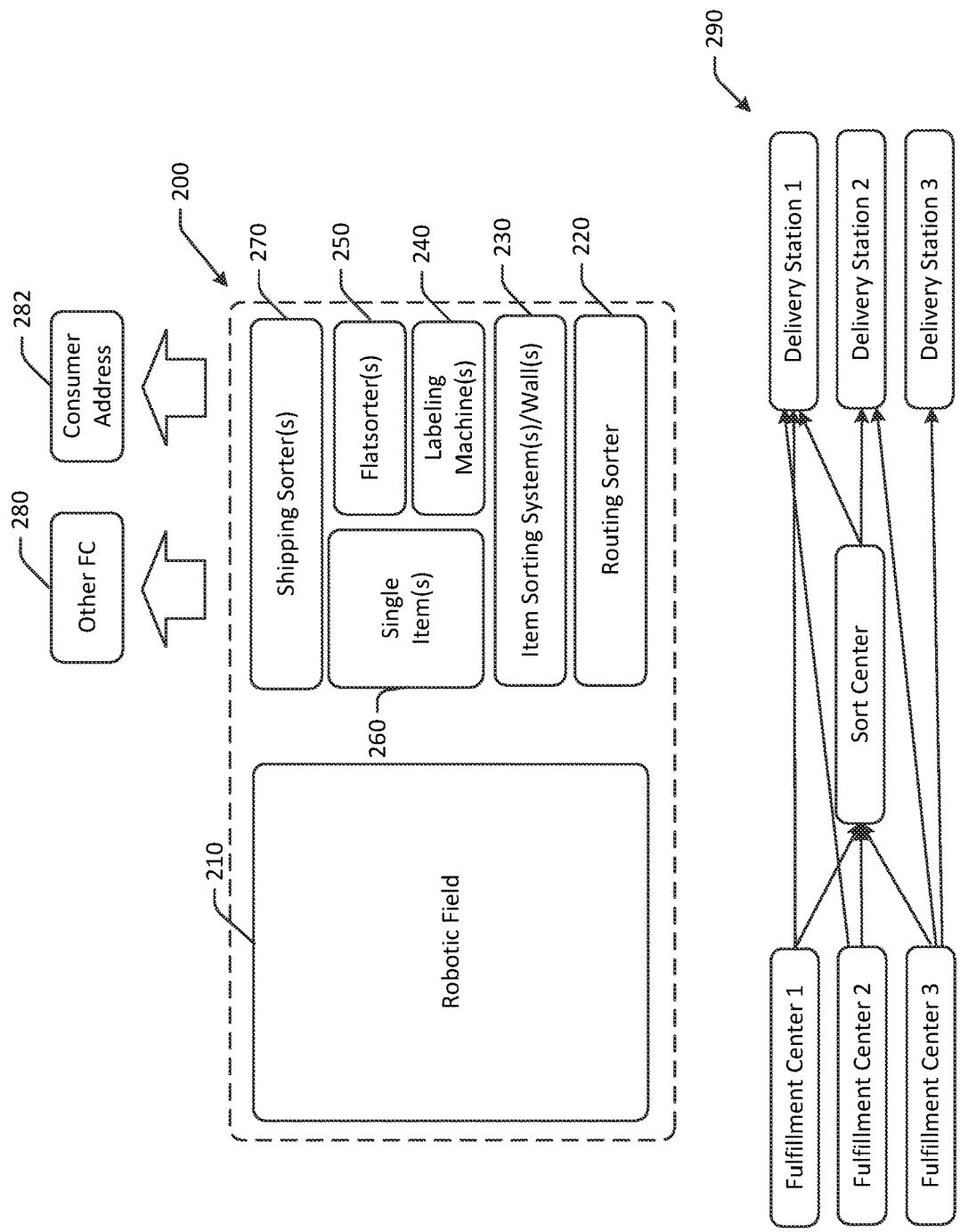
FIG. 2 is a hybrid schematic illustration of an example use case for foldable containers with improved dumping features throughout a facility in accordance with one or more embodiments of the disclosure.

FIG. 2 is a hybrid schematic illustration of an example use case for foldable containers with improved dumping features throughout a facility in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments of the foldable containers described herein may be configured to move from a first facility to a second facility, a third facility, and so on, so as to seamlessly move amongst different facilities in a fulfillment network. For example, a foldable container may move from a fulfillment center to a sort center, and then on to a delivery station or other facility, thereby providing a flexible and dynamic solution without having to unload contents of the foldable container. At any of the locations, the foldable containers may be dumped with reduced jams.

Embodiments of the disclosure include foldable containers with improved dumping features. The foldable containers may be used to store, at least temporarily, packages or other items. Certain embodiments may improve processing speed and/or throughput of fulfillment centers. Certain embodiments may improve performance of mechanical equipment for sortation and/or consolidation of items for multi-item orders via increased tolerances. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
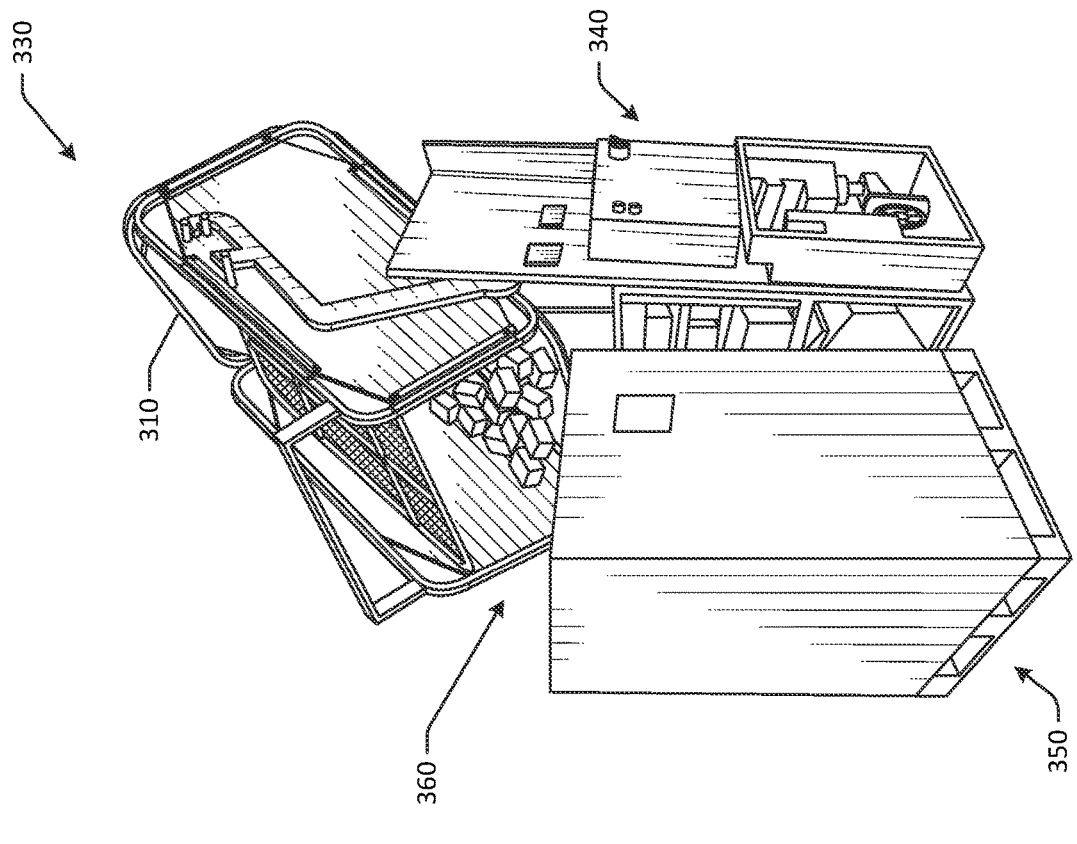
FIG. 3 is a schematic illustration of a foldable container being transported using an autonomous robot, and a foldable container being dumped.
Figure 3:
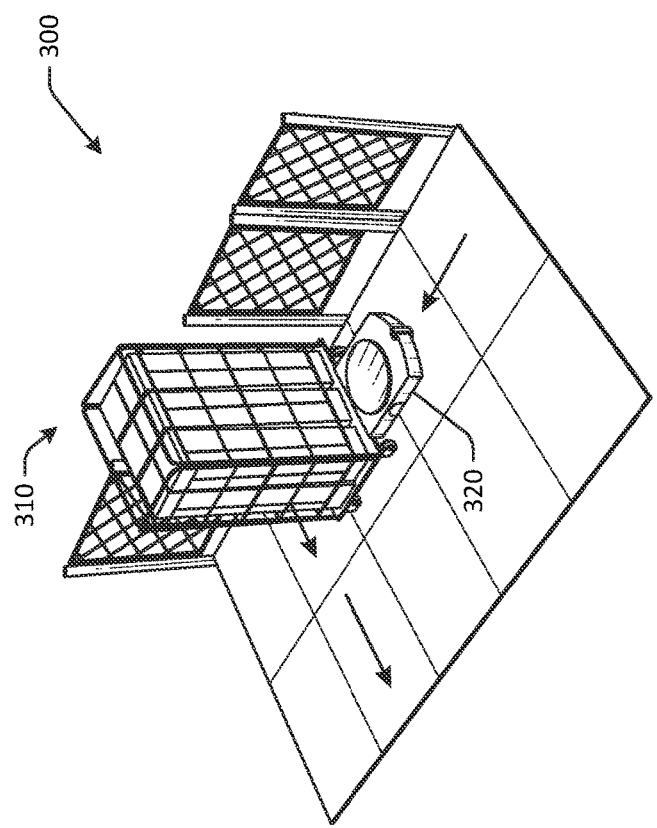

FIG. 3 is a schematic illustration of a foldable container being transported using an autonomous robot, and a foldable container being dumped. Other embodiments may include additional or fewer components. The illustration of FIG. 3 is not to scale, and may not be illustrated to scale with respect to other figures.

In the example of FIG. 3, a foldable container 310 may be positioned in an environment 300, such as a fulfillment center floor, a warehouse environment, or another environment. Unlike embodiments of the disclosure, the foldable container 310 may have one or more mesh sidewalls that may be problematic during dumping. To move throughout the environment 300, the foldable container 310 may be rolled using one or more wheels. For example, a manual operator may move the foldable container 310 by pushing or pulling the foldable container 310 from one location to another. The foldable container 310 may receive, carry, and transport various packages, boxes, items, products, or other objects of various types. In addition, the foldable container 310 may be configured to be lifted, carried, moved, and placed between positions within a material handling facility by robotic drive units, such as the robot 320, or other material handling equipment. In this manner, the foldable container 310 can be pushed by associates on surfaces, e.g., sort center floors, and the foldable container 310 can also be carried and transported by robotic drive units 320.

The foldable container 310 may also be moved using a robot 320, such as an autonomous robot. For example, the robot 320 may be configured to tunnel or otherwise position itself underneath the foldable container 310. The robot 320 may then lift the foldable container 310 off the ground, such that the wheels are separated from the ground, and the robot 320 may then transport the foldable container 310 from one location to another.

The foldable container 310 may maintain the ability to be moved by humans and robots, while also maintaining the ability to fold from a rectangular configuration to an L-shaped folded configuration. The foldable container 310 may include a locking bottom container platform that provides structural rigidity to enable lifting by the robot 320, while also providing the ability for the foldable container 310 to fold.

Accordingly, the foldable container 310 may be configured to be transported using both (i) the one or more, or plurality, of wheels via manual pushing, and (ii) robotic manipulation to lift and move the foldable container 310, such as by the robot 320. The foldable container 320 may be configured to allow an autonomous robot, such as the robot 320, to tunnel underneath a bottom container platform of the foldable container 310. The foldable container 310 may be configured to be lifted from the bottom container platform by an autonomous robot or other robot 320 that is positioned at least partially or entirely underneath a center or middle portion of the foldable container 310 when the foldable container 310 is in the unfolded position (e.g., a rectangular configuration, etc.).

The wheels may include one or more freely-rotating swivel casters associated with a bottom surface of the foldable container 310. For example, the foldable container 310 may include four freely-rotating swivel casters, with one positioned at each corner of the foldable container 310. In some examples, two of the four casters may have a swivel locking feature, such as a manually or foot-operated swivel locking feature, and the other two of the four casters may have a caster rotation locking feature, such as a manually or foot-operated caster rotation locking feature.

To empty the contents of the foldable container 310, such as onto a conveyor, into another container 350 (e.g., a Gaylord, box, etc.), the foldable container 310 may be rotated at least partially upside down during a dumping process 330. The dumping process 330 may be manual or automated and may be performed using various equipment 340. For foldable containers with mesh sidewalls and/or without improved dumping features, packages such as bags, thin envelopes, thin packages, and so forth may get stuck and cause jams 360 that prevent the contents of the foldable container from being emptied. Such jams 360 cause delays to processing time, additional effort to clear jams, and can cause upstream delays.

Figure 4:
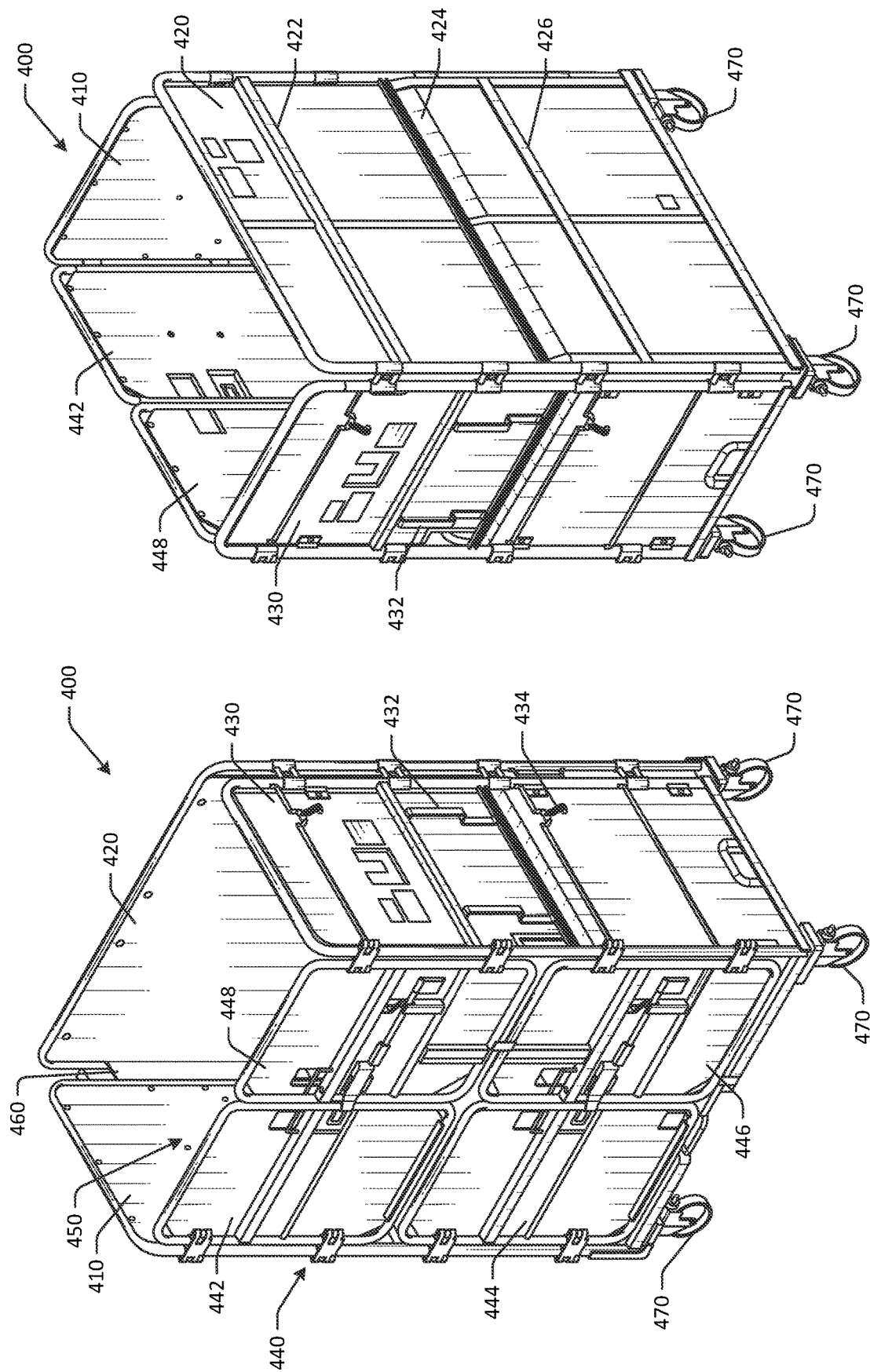
FIG. 4 is a schematic illustration of an example foldable container with improved dumping features in accordance with one or more embodiments of the disclosure.

FIG. 4 is a schematic illustration of an example foldable container 400 with improved dumping features in accordance with one or more embodiments of the disclosure. Other embodiments may include additional or fewer components. The illustration of FIG. 4 may not be to scale, and may not be illustrated to scale with respect to other figures. The foldable container illustrated in FIG. 4 may be the same foldable container discussed with respect to FIGS. 1-2.

In FIG. 4, the foldable container 400 is depicted in both front perspective view and rear perspective view. The foldable container 400 may include a first sidewall 410, a rear wall 420, a second sidewall 430, and front doors 440. Some or all of the walls may be formed of panels, such as plastic panels, and may include various types of plastic or other components. For example, some portions of some or all of the walls may include plastic or other materials that are configured to facilitate sensing or other detection of contents loaded in the foldable container 400. One or more of the walls may be transparent, so as to provide visibility into the contents of the foldable container 400. The panels may be smooth and flat, so as to allow items to move smoothly along the panels. Smooth panels may be low-friction panels, and may optionally have planar contours. Some smooth panels may include perforations and/or other features. The foldable container 400 may have a greater cross-sectional area (e.g., from a top cross-sectional perspective, a side cross-sectional perspective, etc.) at or near a bottom or lower portion of the foldable container 400 than at or near a top or upper portion of the foldable container 400. This may provide a funnel-like effect when dumping items out of the foldable container 400, so as to improve item flow and reduce a likelihood for jams. The four walls of the foldable container 400 may form a rectangular configuration when the foldable container 400 is in an unfolded configuration. Accordingly, items, such as packages, may be disposed in an inside portion 450 of the foldable container 400 when the foldable container 400 is in the unfolded position. The foldable container 400 may include one or more wheels 470 that allow the foldable container 400 to be manually pushed and/or pulled. As discussed with respect to FIG. 7, one or more of the first sidewall 410, the rear wall 420, and/or the second sidewall 430 may include jogs or angled surfaces that facilitate a flow of items out of a top of the foldable container 400 during a dumping process.

Figure 7:
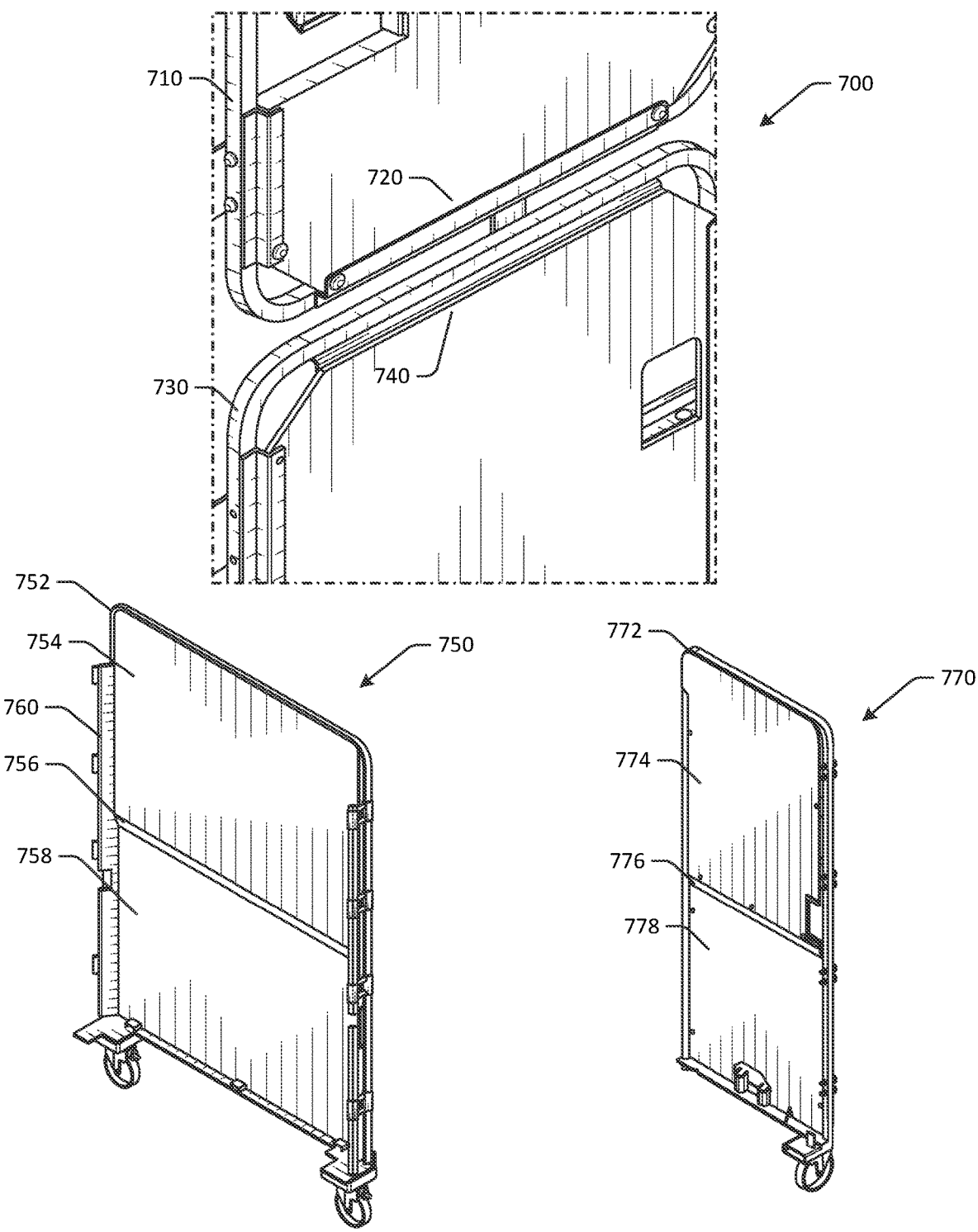
FIG. 7 is a schematic illustration of jogs on various surfaces of a foldable container with improved dumping features in accordance with one or more embodiments of the disclosure.

The rear wall 420 may include one or more smooth panels (that may include an integrated jog, as depicted in the example of FIG. 7) along a rear of the foldable container 400, and may also include one or more lips 460 that extend from the rear panel and cover a joint between the first sidewall 410 and the rear wall 420, and/or a joint between the second sidewall 430 and the rear wall 420. The lip 460 may prevent packages or other items from getting caught or pinched between the walls of the container. The lips 460 may be integrated with the panel(s) of the rear wall 420 or may be separate components coupled to the panel(s) of the rear wall 420. The lip(s) 460 may be a first smooth panel extension disposed perpendicular to a first flat portion of the panel of the rear wall 420, where the first smooth panel extension covers at least a portion of a first joint between the first sidewall 410 and the rear wall 420. The lip(s) may include a second smooth panel extension disposed perpendicular to the first flat portion, where the second smooth panel extension covers at least a portion of the second joint.

As depicted in the rear perspective view, the rear wall 420 may include one or more structural support members 422, 426 disposed behind the panel of the rear wall 420, so as to avoid interference with packages flowing along the panel. The panel of the rear wall 420 may include an angled surface 424 or jog that reduces a cross-sectional area of the foldable container 400 at an upper side relative to a lower side of the foldable container 400.

The second sidewall 430 may include one or more ergonomic handles 432 that are disposed on an outer side of the panel(s) of the second sidewall 430. The ergonomic handles 432 may be formed so as to not extend beyond a frame of the second sidewall 430, and may be disposed relatively higher than a jog formed in the panel of the second sidewall 430. This may be possible due to the jog creating space for the ergonomic handles 432. A hook 434 or other coupling mechanism to couple foldable containers together may be coupled to the second sidewall 430. The second sidewall 430 may be configured to rotate with respect to the rear wall 420.

The foldable container 400 may include a bottom container platform that forms a bottom of the foldable container 400. The bottom container platform may be coupled to the rear wall 420 and may swing or rotate upwards and downwards relative to the rear wall 420.

The first sidewall 410 may be fixed relative to the rear wall 420. For example, the first sidewall 410 may form an L-shaped configuration with the rear wall 420, and may remain at a substantially perpendicular angle relative to the rear wall 420 when the foldable container 400 is in a folded configuration. A fixed hinge or other mechanism may be disposed at a connection between the first sidewall 410 and the rear wall 420. In some embodiments, electronic devices, such as tracking devices, may be coupled to the foldable container 400 at or near the fixed hinge, or elsewhere on the foldable container 400. For example, some embodiments may include Bluetooth-based devices that are configured to provide location data, or data that may be used to locate a particular foldable container, disposed at or near the fixed hinge. Other embodiments may include RFID devices, NFC devices, or other transceiver components that can be used to provide positioning data for a foldable container. Such data may be used to identify the location of a foldable container inside a facility.

The second sidewall 430 may be configured to swing or rotate with respect to the rear wall 420. For example, the second sidewall 430 may be configured to rotate towards the rear wall 420, so as to facilitate folding or collapsing of the foldable container 400 into the folded configuration.

The front doors 440 may be formed of one or more panels. For example, the front doors 440 may include a first panel 442 and a second panel 444 that form a first door. The first panel 442 and the second panel 444 may be coupled to the first sidewall 410. The first panel 442 and the second panel 444 may be coupled to one another or may be decoupled, such that the first panel 442 may rotate with respect to the second panel 444. The first panel 442 and the second panel 444 may be configured to rotate with respect to the first sidewall 410. For example, the first panel 442 and the second panel 444 may be configured to rotate until parallel with the first sidewall 410.

The front doors 440 may include a third panel 448 and a fourth panel 446 that form a second door. The third panel 448 and a fourth panel 446 may be coupled to the second sidewall 430. The third panel 448 and a fourth panel 446 may be coupled to one another or may be decoupled, such that the third panel 448 may rotate with respect to the fourth panel 446. The third panel 448 and a fourth panel 446 may be configured to rotate with respect to the second sidewall 430. For example, the third panel 448 and a fourth panel 446 may be configured to rotate until parallel with the second sidewall 430.

To convert from the depicted unfolded configuration to a folded configuration, the second door may be rotated parallel to the second sidewall 430, and the second sidewall 430 may be rotated to be parallel with the rear wall 420. The first door may be rotated to be parallel with the first sidewall 410. The bottom container platform may be rotated to be parallel with the rear wall 420.

The foldable container 400 may include a plurality of wheels 470 that are coupled to one or more of the walls. The foldable container 400 may be configured to be transported using (i) the plurality of wheels via manual pushing, and (ii) robotic manipulation to lift and move the foldable container.

The wheels 470 may be self-positioning swivel casters may have associated home positions that may be defined positions or orientations of the swivel casters when lifted, stationary, and/or stopped. For example, the home positions of self-positioning swivel casters associated with a container, cart, or other material handling equipment may increase or maximize space or clearance under the cart when the cart is stationary or stopped. In some example embodiments, robotic drive units or other types of material handling equipment, e.g., manual, automated, or robotic equipment, may be inserted or placed under the cart and between the self-positioning swivel casters, such that increasing or maximizing space or clearance under the cart and between the self-positioning swivel casters may facilitate reliable operations and prevent collisions or interferences between robotic drive units and portions of the cart. In other example embodiments, the home positions of self-positioning swivel casters associated with a container, cart, or other material handling equipment may be positioned substantially within an outer periphery, dimensions, or footprint associated with a receptacle of the cart when the cart is stationary or stopped, such that a plurality of carts may be positioned or stored adjacent to each other with minimal gap or clearance therebetween and without causing interference between respective swivel casters associated with adjacent carts. In addition, the home positions of self-positioning swivel casters associated with a cart or other material handling equipment may enable a cart to substantially remain in position when lifted, stationary, or stopped. For example, a cart may be placed at a position on a substantially flat or horizontal floor or other surface of a material handling facility. However, due to irregularities, imperfections, protrusions, indentations, edges, slopes, angles, cracks, debris, or other surface characteristics associated with the surface, a cart that is stationary or stopped may move or drift, e.g., due to gravity. The home positions of self-positioning swivel casters may be selected or configured to prevent such movement or drift of a cart due to surface characteristics associated with a position at which the cart is placed.

The foldable container 400 may therefore include a first container wall (e.g., the rear wall 420), a second container wall (e.g., the second sidewall 430) coupled to the first container wall at a first joint, the second container wall configured to rotate outwards in a first direction with respect to the first container wall, a third container wall (e.g., the first sidewall 410) coupled to the first container wall at a second joint, the third container wall oriented perpendicular to the first container wall, and a plurality of wheels. The foldable container 400 may include a bottom container platform configured to rotate outwards in a second direction with respect to the first container wall, the bottom container platform having an automatic locking mechanism configured to engage with the second container wall when the foldable container is in an unfolded position. A first cross-sectional area of the foldable container 400 at a lower portion of the foldable container may be greater than a second cross-sectional area of the foldable container at an upper portion of the foldable container 400.

The rear wall 420 may include a frame and a smooth panel coupled to the frame, the smooth panel having a first flat portion, a second flat portion, and an angled portion disposed between the first flat portion and the second flat portion, as depicted in FIG. 7. The first flat portion and the second flat portion may be disposed on parallel planes, and the angled portion may be disposed at an angle relative to the first flat portion and the second flat portion.

A left-side door of the foldable container 400 may include a first portion and a second portion, where the first portion and the second portion are configured to independently rotate with respect to the first sidewall 410 Similarly, a right-side door of the foldable container 400 may include a third portion and a fourth portion, where the third portion and the fourth portion are configured to independently rotate with respect to the second sidewall 430.

Figure 5:
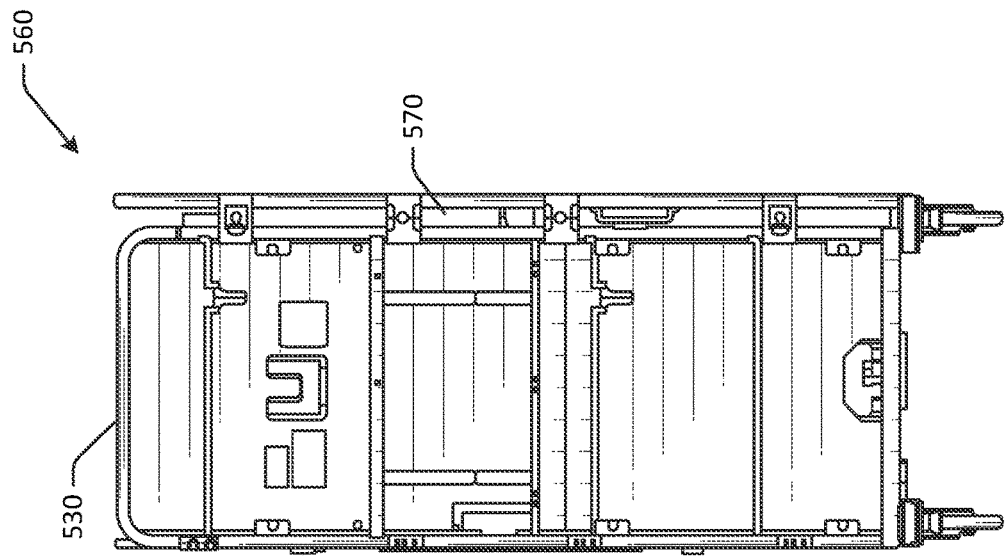
FIG. 5 is a schematic illustration of a front view and side view of a foldable container with improved dumping features in accordance with one or more embodiments of the disclosure.
Figure 5:
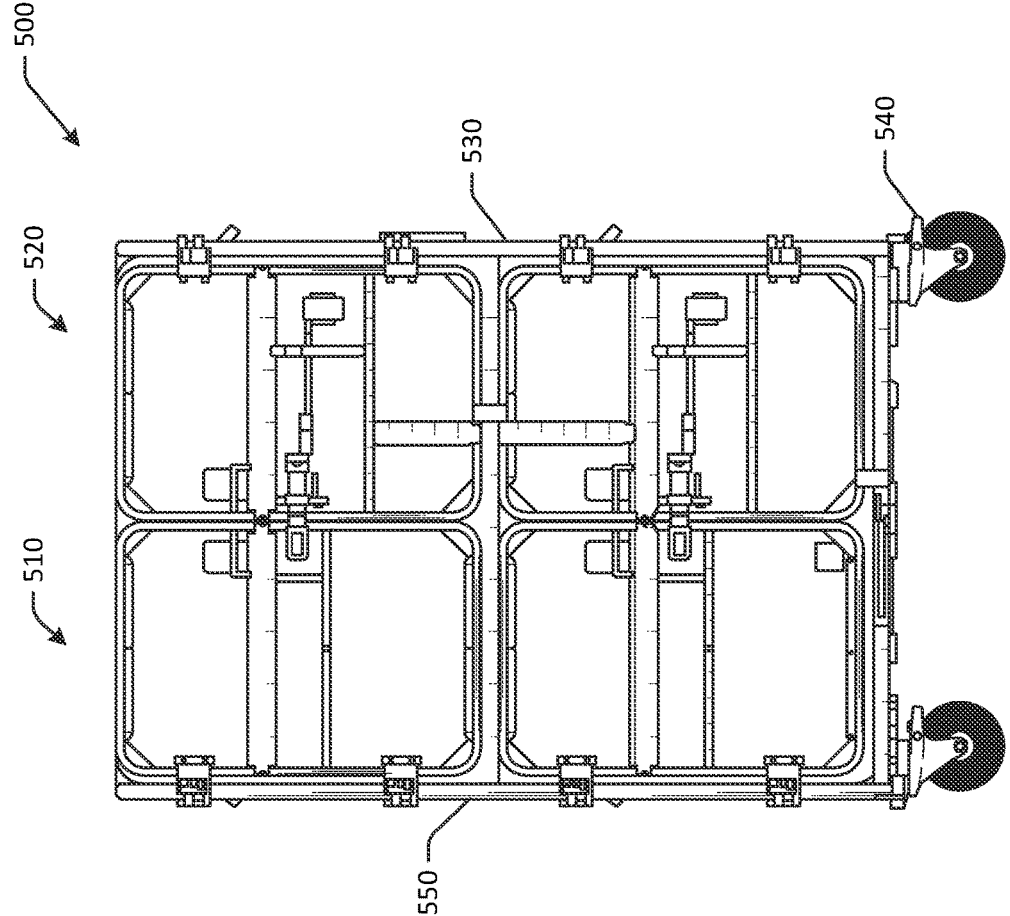

FIG. 5 is a schematic illustration of a front view and side view of a foldable container 500 with improved dumping features in accordance with one or more embodiments of the disclosure. Other embodiments may include additional or fewer components. The illustration of FIG. 5 may not be to scale, and may not be illustrated to scale with respect to other figures. The foldable container illustrated in FIG. 5 may be the same foldable container discussed with respect to FIG. 4.

The foldable container 500 depicted in front view and side view 560 in FIG. 5. The foldable container 500 may be the same foldable container depicted in FIG. 4. The foldable container 500 may include a first door 510 and a second door 520. The first door 510 may be formed of one or more individual panels, and may be configured to rotate relative to a second sidewall 550. The first door 510 may be configured to rotate relative to the second door 520. The first door 510 may have one or more panels formed of plastic, metal, a composite, or another type of material.

The second door 520 may be formed of one or more individual panels, and may be configured to rotate relative to a first sidewall 530. The second door 520 may be configured to rotate relative to the first door 510. The second door 520 may have one or more panels formed of plastic, metal, a composite, or another type of material.

The left-side door or the first door 510 may include a first smooth panel coupled to the first portion, and a second smooth panel coupled to the second portion. In some embodiments, the second smooth panel may at least partially overlap the first smooth panel, as discussed with respect to FIG. 7. The second smooth panel may at least partially overlap the first smooth panel when the door is in a closed position.

The right-side door or the second door 520 may include a first smooth panel coupled to the first portion, and a second smooth panel coupled to the second portion. In some embodiments, the second smooth panel may at least partially overlap the first smooth panel, as discussed with respect to FIG. 7. The second smooth panel may at least partially overlap the first smooth panel when the door is in a closed position.

The foldable container 500 may include one or more wheels 540 and a rear wall 570 that is fixed relative to the second sidewall 550. The foldable container 500 may include a latch or other mechanism that may be configured to secure the second door 520 to the first sidewall 530 in the folded configuration.

The foldable container 500 may therefore include the back wall 570, the first sidewall 530 that is configured to rotate outwards with respect to the back wall 570, and the second sidewall 550 that is fixed with respect to the back wall 570. The foldable container 500 may include a bottom container platform configured to rotate downwards with respect to the back wall 570, where the bottom container platform includes an automatic locking mechanism configured to engage with the first sidewall 530 and the second sidewall 550 when the foldable container is in an unfolded position. The foldable container 500 may be configured to be transported via both manual pushing and robotic manipulation.

The foldable container 500 may form an L-shaped configuration when the foldable container is in a folded position. The foldable container 500 may be configured to be stacked with other foldable containers in a nested L-shaped configuration. The foldable container 500 may have a first cross-sectional area at a lower portion of the foldable container that is greater than a second cross-sectional area of the foldable container at an upper portion of the foldable container.

Figure 6:
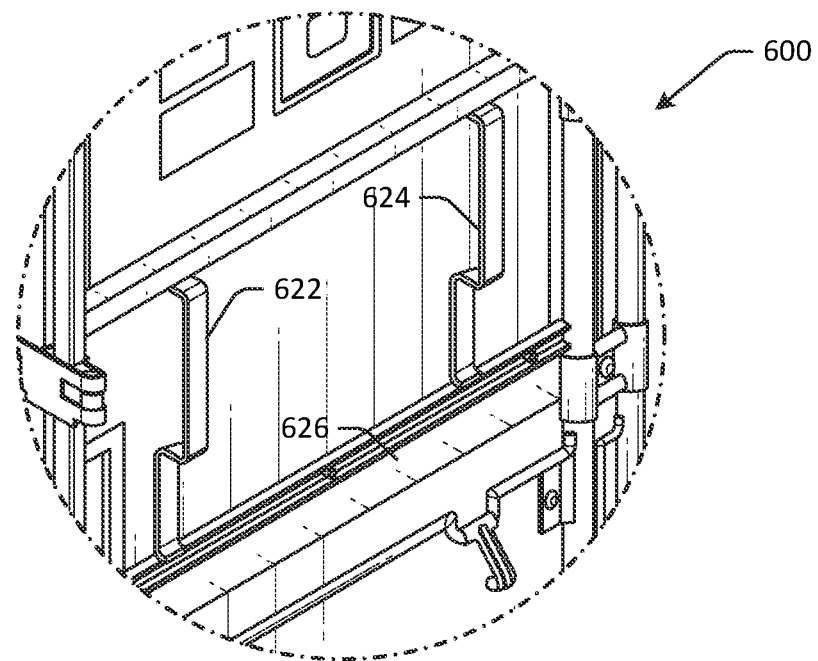
FIG. 6 is a schematic illustration of close-up views of various portions of a foldable container with improved dumping features in accordance with one or more embodiments of the disclosure.

FIG. 6 is a schematic illustration of close-up views of various portions of a foldable container with improved dumping features in accordance with one or more embodiments of the disclosure. Other embodiments may include additional or fewer components. The illustration of FIG. 6 may not be to scale, and may not be illustrated to scale with respect to other figures. The components illustrated in FIG. 6 may be used with any of the foldable containers discussed with respect to FIGS. 1-2 and 4-5.

Some embodiments may push handles 600, where individual push handles 622, 624 may have an "S"-like geometrical configuration and, in some embodiments, may not extend beyond a frame of the sidewall. The push handles 622, 624 may be flush with a lower panel of the sidewall, where space is created for the push handles via a jog 626 in the sidewall panel(s).

FIG. 7 is a schematic illustration of jogs on various surfaces of a foldable container with improved dumping features in accordance with one or more embodiments of the disclosure. Other embodiments may include additional or fewer components. The illustration of FIG. 7 may not be to scale, and may not be illustrated to scale with respect to other figures. The foldable container illustrated in FIG. 7 may be the same foldable container discussed with respect to FIGS. 1-2 and 4-6.

A door section of a foldable container is depicted in first close-up view 700. Individual door sections may include a first frame 710 and a second frame 730 that are both vertically aligned. The frames may optionally move independent of each other. A first smooth panel 720 may be coupled to the first frame 710, and a second smooth panel 740 may be coupled to the second frame 730. The first frame 710 may be an upper portion of the door section, and the second frame 730 may be a lower portion of the door section.

At the depicted bottom side of the first frame 710, the first smooth panel 720 may be coupled to an inside surface (e.g., an interior side of the container) of the first frame 710, and at a top side of the first frame 710, the first smooth panel 720 may be coupled to an outer surface of the first frame 710.

Similarly, at the depicted top side of the second frame 730, the second smooth panel 740 may be coupled to an outside surface (e.g., an exterior side of the container) of the second frame 740, and at a bottom side of the second frame 730, the first smooth panel 720 may be coupled to an outer surface of the first frame 710.

A rear wall of a foldable container is depicted in isolated view 750. The rear wall may include a frame 752. The rear wall may include a single panel (or multiple panels coupled together) coupled to the frame 752. The panel may have a first flat portion 754, a second flat portion 758, and an angled portion 756 disposed between the first flat portion 754 and the second flat portion 758. The angled portion 756 may form a jog in the panel. The first flat portion 754 and the second flat portion 758 may be disposed on parallel planes, and the angled portion 756 may be disposed at an angle relative to the first flat portion 754 and the second flat portion 758. One or more lips 760 may extend perpendicularly from the first flat portion 754, the angled portion 756, and/or the second flat portion 758 on one or both sides of the rear wall.

A sidewall of a foldable container is depicted in isolated view 770. The sidewall may include a frame 772. The sidewall may include a single panel (or multiple panels coupled together) coupled to the frame 772. The panel may have a first flat portion 774, a second flat portion 778, and an angled portion 776 disposed between the first flat portion 774 and the second flat portion 778. The angled portion 776 may form a jog in the panel. The first flat portion 774 and the second flat portion 778 may be disposed on parallel planes, and the angled portion 776 may be disposed at an angle relative to the first flat portion 774 and the second flat portion 778.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
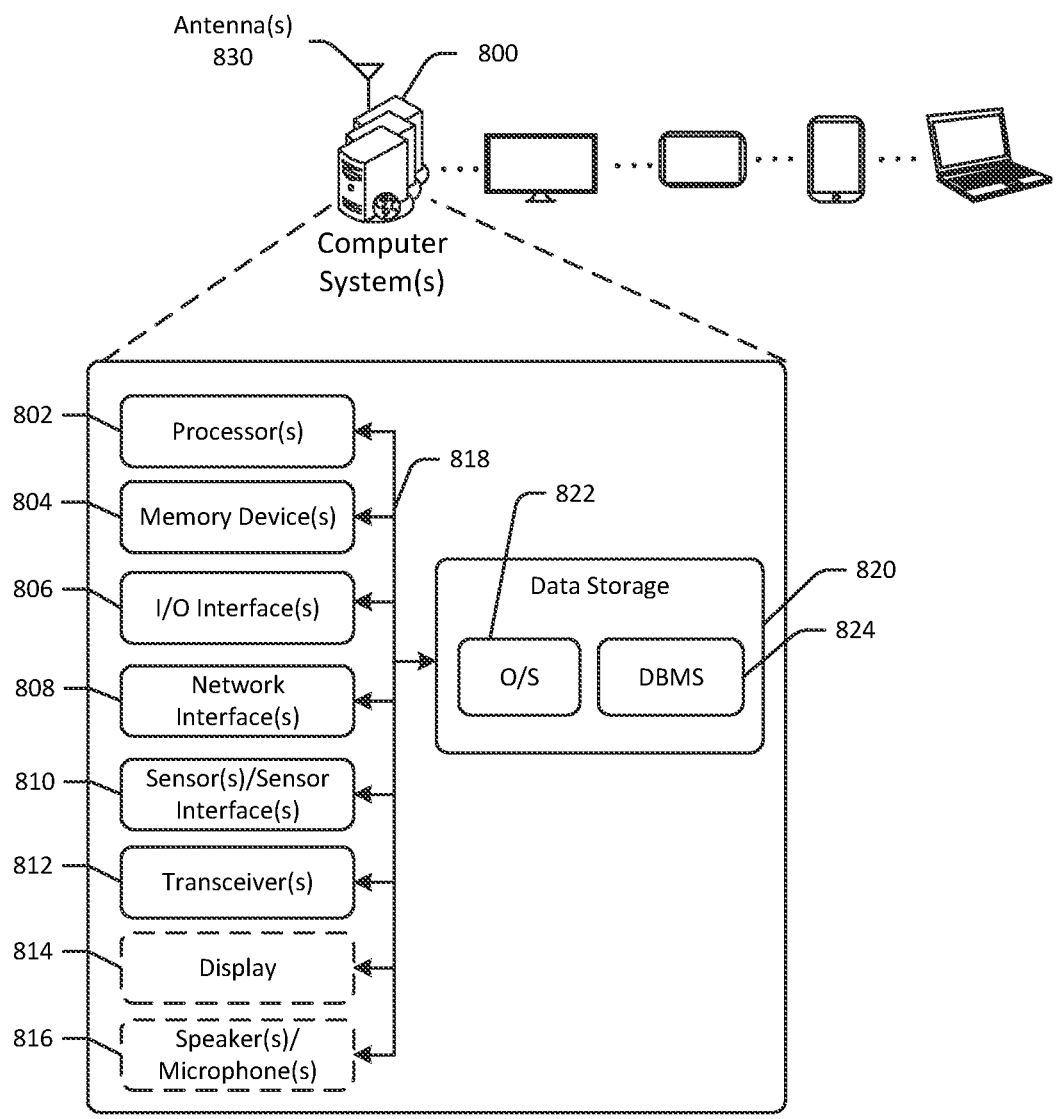
FIG. 8 schematically illustrates an example architecture of a computer system associated with a robotic system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the robotic system(s) of FIGS. 1-7, such as robotic manipulators and/or autonomous robotic vehicles.

The computer system(s) 800 may be configured to communicate with one or more servers, user devices, or the like. The computer system(s) 800 may be configured to cause the robotic system(s) to deposit containers into one or more pods, retrieve containers, transport containers, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. An open top foldable container comprising:
   a rear wall comprising:
     a frame; and
     a smooth panel coupled to the frame, the smooth panel comprising a first flat portion, a second flat portion, and an angled portion disposed between the first flat portion and the second flat portion;
     wherein the first flat portion and the second flat portion are disposed on parallel planes, and the angled portion is disposed at an angle relative to the first flat portion and the second flat portion;
   a first sidewall coupled to the rear wall, wherein the first sidewall has a fixed position relative to the rear wall;
   a second sidewall coupled to the rear wall and configured to rotate with respect to the rear wall;
   a bottom container platform; and
   a plurality of wheels;
   wherein a first cross-sectional area of the foldable container at a lower portion of the foldable container is greater than a second cross-sectional area of the foldable container at an upper portion of the foldable container.

2. The open top foldable container of claim 1, wherein the rear wall further comprises:
a first smooth panel extension disposed perpendicular to the first flat portion, wherein the first smooth panel extension covers at least a portion of a first joint between the rear wall and the first sidewall; and
a second smooth panel extension disposed perpendicular to the first flat portion, wherein the second smooth panel extension covers at least a portion of a second joint between the rear wall and the second sidewall;
wherein the first flat portion is disposed on a first side of the frame at the upper portion of the foldable container, and the second flat portion is disposed on a second side of the frame at the lower portion of the foldable container.

3. The open top foldable container of claim 1, further comprising:
a third sidewall coupled to the second sidewall, the third sidewall configured to rotate away from the second sidewall from a first position perpendicular to the rear wall to a second position parallel to the second sidewall, the third sidewall comprising:
a first portion;
a first smooth panel coupled to the first portion;
a second portion, wherein the first portion and the second portion are configured to independently rotate with respect to the second container wall; and
a second smooth panel coupled to the second portion.

4. The open top foldable container of claim 1, wherein the foldable container is configured to be lifted from the bottom container platform by an autonomous robot that is positioned underneath the foldable container when the foldable container is in the unfolded position; and
wherein the foldable container is configured to be transported using (i) the plurality of wheels via manual pushing, and (ii) robotic manipulation to lift and move the foldable container.

5. A foldable container comprising:
a first container wall comprising a frame and a smooth panel coupled to the frame, wherein the smooth panel comprises a first flat portion, a second flat portion, and an angled portion disposed between the first flat portion and the second flat portion;
a second container wall coupled to the first container wall at a first joint, the second container wall configured to rotate outwards in a first direction with respect to the first container wall;
a third container wall coupled to the first container wall at a second joint, the third container wall oriented perpendicular to the first container wall; and
a plurality of wheels.

6. The foldable container of claim 5, wherein the foldable container is configured to be transported using (i) the plurality of wheels via manual pushing, and (ii) robotic manipulation to lift and move the foldable container.

7. The foldable container of claim 5, wherein the first flat portion of the first container wall and the second flat portion of the first container wall are disposed on parallel planes, and the angled portion of the first container wall is disposed at an angle relative to the first flat portion and the second flat portion; and
wherein a first cross-sectional area of the foldable container at a lower portion of the foldable container is greater than a second cross-sectional area of the foldable container at an upper portion of the foldable container.

8. The foldable container of claim 5, wherein the first flat portion is disposed on a first side of the frame at the upper portion of the foldable container, and the second flat portion is disposed on a second side of the frame at the lower portion of the foldable container.

9. The foldable container of claim 5, wherein the first container wall further comprises:
a first smooth panel extension disposed perpendicular to the first flat portion, wherein the first smooth panel extension covers at least a portion of the first joint; and
a second smooth panel extension disposed perpendicular to the first flat portion, wherein the second smooth panel extension covers at least a portion of the second joint.

10. The foldable container of claim 5, wherein the second container wall comprises:
a frame; and
a smooth panel coupled to the frame, the smooth panel comprising a first flat portion, a second flat portion, and an angled portion disposed between the first flat portion and the second flat portion;
wherein the first flat portion and the second flat portion are disposed on parallel planes, and the angled portion is disposed at an angle relative to the first flat portion and the second flat portion.

11. The foldable container of claim 5, further comprising:
a fourth container wall coupled to the second container wall, the fourth container wall configured to rotate away from the second container wall from a first position perpendicular to the first container wall to a second position parallel to the first container wall;
wherein the fourth container wall comprises a first portion and a second portion, and wherein the first portion and the second portion are configured to independently rotate with respect to the second container wall.

12. The foldable container of claim 11, wherein the fourth container wall further comprises:
a first smooth panel coupled to the first portion; and
a second smooth panel coupled to the second portion.

13. The foldable container of claim 5, further comprising:
wherein the third container wall is fixed relative to the first container wall, such that the foldable container forms an L-shaped configuration when the foldable container is in a folded position.

14. The foldable container of claim 5, further comprising:
a bottom container platform.

15. The foldable container of claim 14, wherein the foldable container is configured to be lifted from the bottom container platform by an autonomous robot that is positioned at least partially underneath a center of the foldable container when the foldable container is in the unfolded position.

16. The foldable container of claim 5, wherein the foldable container is configured to be stacked with other foldable containers in a nested L-shaped configuration.

17. A non-mesh foldable container comprising:
a back wall comprising:
a first smooth panel;
a frame, wherein the first smooth panel is coupled to the frame, the first smooth panel comprising a first flat portion, a second flat portion, and an angled portion disposed between the first flat portion and the second flat portion;
wherein the first flat portion and the second flat portion are disposed on parallel planes, and the angled portion is disposed at an angle relative to the first flat portion and the second flat portion; and wherein the first flat portion is disposed on a first side of the frame at the upper portion of the foldable container, and the second flat portion is disposed on a second side of the frame at the lower portion of the foldable container;

a first sidewall configured to rotate outwards with respect to the back wall, the first sidewall comprising a second smooth panel;

a second sidewall that is fixed with respect to the back wall, the second sidewall comprising a third smooth panel;

a bottom platform; and a plurality of wheels.

18. The non-mesh foldable container of claim 17, wherein the back wall further comprises:

a first smooth panel extension disposed perpendicular to the first flat portion, wherein the first smooth panel extension covers at least a portion of a gap between the back wall and the first sidewall; and a second smooth panel extension disposed perpendicular to the first flat portion, wherein the second smooth panel extension covers at least a portion of a gap between the back wall and the second sidewall.

19. The non-mesh foldable container of claim 17, wherein the foldable container is configured to be transported via both manual pushing and robotic manipulation.

20. The non-mesh foldable container of claim 17, wherein the foldable container is configured to be stacked with other foldable containers in a nested L-shaped configuration.

* * * * *